Patented Apr. 18, 1944

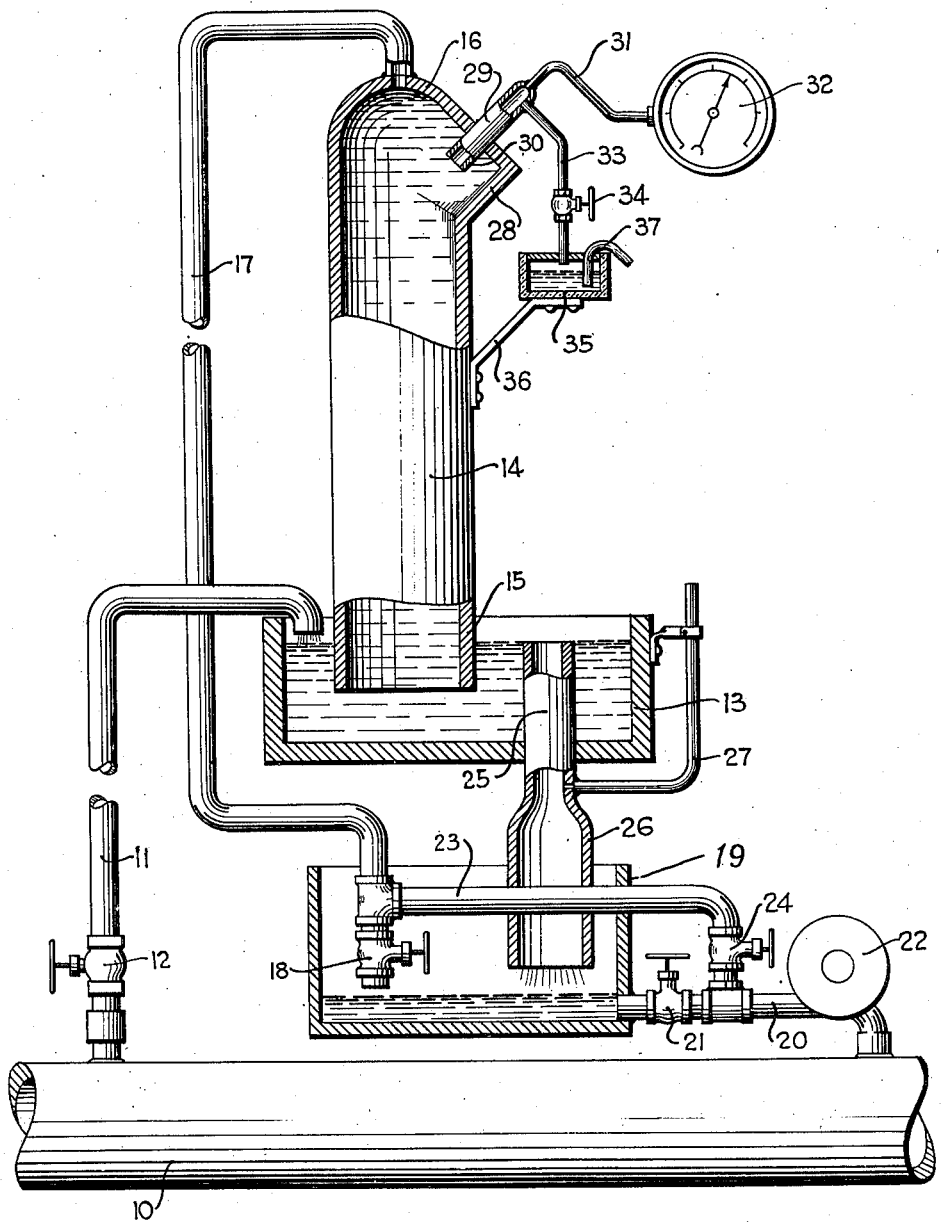

2,346,721

UNITED STATES PATENT OFFICE 2,346,721

DENSITY DETERMINING DEVICE

Ross Bassinger, Houston, Tex.

Application February 27, 1942, Serial No. 432,649

9 Claims. (Cl. 265—44)

This invention relates to new and useful improvements in density determining devices.

Various devices have been developed heretofore for the determination of the density of liquids, said devices operating on the foundations of various physical laws. One type of such device has operated upon the principle of determining the differential pressure between different hydrostatic levels in a column of fluid under examination. In the handling of liquids containing volatile fractions, this type of device has not proved feasible due to the condensation of volatile fractions within the pressure lines of the equipment, resulting in false readings and an erroneous determination of density or specific gravity.

It is, therefore, one object of this invention, and an important object, to provide an improved device for determining liquid densities, wherein means are provided for preventing the condensation of volatile liquids within portions of the device wherein such condensation would be injurious to the operation of the device.

It is another object of this invention to provide an improved liquid density determining device which is adapted to operate continuously upon sources of liquid under pressure, so as to give a continuous record of the liquid flowing from said source.

Still another object of the invention is to provide an improved liquid density determining device in which means are provided for compensating for the effect upon the device of varying viscosities of the liquid being examined.

A still further object of the invention is to provide an improved liquid density determining device which is simple and efficient in its operation, and which determines the density of the liquid accurately and continuously.

A construction designed to carry out the invention will be hereinafter described, together with other features of the invention.

The invention will be more readily understood from a reading of the following specification and by reference to the accompanying drawing, in which an example of the invention is shown, and wherein:

The figure in the drawing represents a side view, partly in elevation and partly in section, of a device constructed in accordance with the invention.

In the drawing, the numeral 10 designates a pipe, which may be a liquid carrying pipeline, such as an oil pipeline, or may be a pipe leading to a source of liquid which it is desired to examine as it is being conducted to another point. The device is not to be limited to use in any particular instance, but may be utilized in any desirable fashion and in any occasion in which it is desired to determine a density over a period of time of a liquid which may be in the process of being transferred from one location to another.

A pipe 11 leads from the side of the pipe 10 through a valve 12 into a sump or receptacle 13. The liquid in the pipe 10 is usually under pressure so that upon opening the valve 12, a portion of the liquid will flow into the sump 13. However, if necessary or desirable, a suitable pump (not shown) may be situated so as to deliver liquid from the pipe 10 into the sump 13.

A hollow cylindrical conductor or conduit 14 is vertically positioned above the sump 13, so as to have its open lower end 15 disposed within the sump, while its closed upper end 16 is positioned some distance above the sump. A syphon tube or pipe 17 communicates with the upper end 16 of the conduit 14 and extends downwardly to a point some distance below the sump 13, terminating in a valve 18. The conduit 14 and the pipe 17 form a syphon which draws liquid from the sump 13 up through the conduit 14 and down through the pipe 17. The latter pipe is relatively small in diameter so that the liquid velocity therethrough is sufficiently high as to prevent the occurrence of vapor locks and similar disturbances, while the conduit 14 is somewhat larger in diameter than the pipe 17 so that a relatively low liquid velocity therethrough is maintained. The liquid flowing through the pipe 17 is discharged through the valve 18 into a lower sump 19, from which the liquid is withdrawn through a pipe 20, carrying a valve 21, by means of a pump 22, and forced to reenter the pipe 10 under the pressure of said pump. The point of reentry is spaced some distance down stream from the point at which the pipe 11 taps into the pipe 10, whereby liquid which has been passed through the system may not reenter the same through the pipe 11.

The pipe 17 is provided with a branch connection 23 immediately above the valve 18, said branch extending through a valve 24 into the pipe 20 below the valve 21. This arrangement is provided so that the syphon through the pipe 17 may be started after having been broken. By closing the valves 18 and 21 and opening the valve 24, the pump 22, when started, exerts its suction directly upon the pipe 17 so as to pull liquid upwardly in the conduit 14 and down through the pipe 17, thus starting a syphon action. After the syphon has been started, the valves 18 and 21 may be opened and the valve 24 closed so that the liquid flows through the pipe 17 at the normal syphon rate, discharging into the sump 19 and being removed therefrom through the pipe 20.

An overflow pipe 25 is vertically positioned within the upper sump 13, and extends through the bottom thereof into the lower sump 19, the lower portion 26 of said pipe being enlarged at a point below the bottom of the sump 13 so as to insure the rapid removal of liquid flowing therethrough. A vent pipe 27 extends laterally and upwardly from the pipe 25 at a point immediately above the enlarged portion 26 so as to supply air to the pipe 25 and prevent the occurrence of a syphon action within said pipe, which action would be detrimental to one of the functions of this pipe, as will be more fully explained hereinafter. The upper end of the pipe 25 terminates short of the upper side of the sump 13 so as to maintain a liquid level above the lower end of the conduit 14, and also to prevent the overflow of the sump.

The conduit 14 is provided with a lateral bulge or offset portion 28 near its upper end, said offset portion being in the shape of a truncated cylinder which is positioned so as to have its flat end facing upwardly and disposed at an angle of approximately 45°. The shape and position of this offset portion is, of course, not material to the invention so long as a support for the elements to be described hereinafter is provided.

A short tubular member or nipple 29, having an open lower end 30, projects a short distance into the portion 28 through the wall of said portion, and also extends some distance outwardly and upwardly from said portion. As shown in the drawing, the nipple is mounted perpendicular to the flat end of the cylindrical bulge 28 so as to extend upwardly at an angle of approximately 45° from the interior of the conduit 14. A small pipe 31 leads from the closed upper end of the nipple to a draft gauge 32, which may be of any desirable type and construction. However, it has been found preferable to use a recording type gauge so as to produce a continuous record over a period of time of the pressure within the nipple 29.

A second small pipe 33 leads from the outer end of the nipple through a needle valve 34 into a closed container 35 which is filled with water or some other liquid, and is preferably constructed of glass, or some other suitable provision made which will allow the quick determination of the liquid level within the container. The container is supported upon a bracket 36 which is secured to the side of the conduit 14. A small inverted U-tube 37 is mounted upon the container 35 so as to have one end open to the atmosphere, and the other end extending below the liquid level within the container so as to supply air to the interior of the chamber by bubbling the same through the liquid contained therein.

The principle of operation of this device is that, as liquid flows through the conduit 14 and the pipe 17, there is exerted, upon the open lower end 30 of the nipple 29, a vacuum, or a pressure less than atmospheric, which is directly proportional to the density of the liquid flowing through the conduit. This pressure is indicated upon the draft gauge 32 by means of the pipe 31, and since the draft gauge is open to the atmosphere, the reading upon the gauge amounts to a reading of the vacuum, or partially vacuum, present within the nipple 29. Thus, the gauge 32 may be calibrated to read in any desirable units, and will indicate thereby the density of the liquid within the conduit 14 in any desirable units.

Due to the fluctuation in density of the liquid being examined, unless other provision were made, the liquid level within the nipple 29 would fluctuate, thereby causing an error in the readings of the gauge 32. For the purpose of eliminating this error, the pipe 33 is provided so as to supply air, which has been washed through the liquid air, within the container 35, to the interior of the nipple. This flow of air is slight, and may be adjusted by means of the needle valve 34. The stream of air constantly replenishes the air within the nipple 29 so as to hold the liquid level at a constant point. If the density of the liquid being examined drops, the excess air will bubble out through the open end 30 of the nipple and be carried off through the pipe 17. Thus, the column of liquid within the conduit 14, below the lower end 30 of the nipple, is not aerated and is not, therefore, changed in density. As a matter of fact, there is a constant stream of small bubbles of air escaping from the open end 30 of the nipple, due to the suction placed upon the nipple, whereby the liquid level therein is maintained at a constant position. The stream of air is not sufficiently large as to cause an appreciable error in the reading of the gauge 32. However, if such error does exist, it may be compensated for within the gauge itself.

As pointed out hereinbefore, the flow of liquid through the conduit 14 is relatively small, so that in effect, the suction exerted within the nipple, and registered on the gauge 32, represents the weight of a static column of liquid of a height equal to the distance between the lower end of the nipple 29 and the liquid level within the sump 13, or the suction that would be exerted by such a column. It happens, that sometimes a liquid of high viscosity would alter the reading of the gauge 32, by reason of the resistance offered to the flow of the liquid through the conduit due to the high viscosity, thus causing an erroneous reading upon the gauge. The error that might be caused by such an occurrence is compensated for and eliminated by reason of the overflow pipe 25. As the viscosity of the liquid being examined increases, the liquid level maintained in the sump 13 will increase slightly, due to the build up of the liquid to a higher level before it flows into the overflow pipe, thereby shortening the column of liquid being measured and substantially correcting the error. This is a well-known phenomenon, which need not be further explained.

Thus, there is provided a liquid density measuring device which makes continuous readings of the density of a column of fluid which is flowing at a substantially uniform rate, and wherein means are provided for eliminating errors due to changes in density and viscosity.

Various changes, alterations and modifications may be made in the size, shape and arrangement of the herein described elements, within the scope of the appended claims.

What I claim and desire to secure by Letters Patent is:

1. A liquid density determining device including, a conductor having its lower end disposed in a body of liquid, means for maintaining said body of liquid at a substantially constant level, said conductor forming one leg of a syphon by means of which liquid is caused to flow through said conductor, and means for indicating the vacuum exerted by a column of liquid within the conductor from a predetermined point to the substantially constant level of the body of liquid below said conductor, said vacuum indication being indicative of the density of the liquid.

2. A liquid density determining device including, a conductor having its lower end disposed within a body of liquid arranged so as to have a substantially constant level, said conductor forming one leg of a syphon by means of which liquid is caused to flow through the conductor, a tubular member communicating with the interior of the conductor at a point above said liquid level, means for indicating the vacuum exerted within said member by the column of liquid between the member and the substantially constant liquid level, and means for introducing a fluid within said member so as to maintain the liquid level in said member constant.

3. A liquid density determining device includin, a conductor having its lower end disposed within a body of liquid arranged so as to have a substantially constant level, said conductor forming one leg of a syphon by means of which liquid is caused to flow through the conductor, a tubular member communicating with the interior of the conductor at a point above said liquid level, means for indicating the vacuum exerted within said member by the column of liquid between the member and the substantially constant liquid level, and means for introducing a fluid within said member so as to maintain the liquid level in said member constant, the fluid introducing means including a container having therein the liquid being tested for washing said fluid prior to its introduction to the tubular member.

4. A liquid density determining device including, a conductor having its lower end disposed within a body of liquid, the body of liquid being exposed to atmospheric pressure, means for maintaining said body of liquid at a substantially constant level, said conductor forming one leg of a syphon by means of which liquid is caused to flow upwardly from the body of liquid through the conductor, and means for indicating the vacuum at a predetermined point exerted by the column of liquid between said point and the level of the body of liquid, said vacuum being indicative of the density of the liquid.

5. A liquid density determining device including, a conductor having its lower end disposed within a body of liquid, the body of liquid being exposed to atmospheric pressure, means for maintaining said body of liquid at a substantially constant level, said conductor forming one leg of a syphon by means of which liquid is drawn upwardly through the conductor from the body of liquid, a tubular member communicating with the interior of the conductor and having means connected thereto for indicating the vacuum exerted by the column of liquid from the tubular member to the substantially constant liquid level, and means for introducing fluid into said member so as to maintain the liquid level within said member substantially constant.

6. A liquid density determining device adapted for use with pipes carrying liquid including, means for delivering liquid from the pipe into a liquid reservoir, an overflow pipe positioned in the reservoir so as to maintain the liquid level therein substantially constant, said overflow pipe being of such a size as to cause liquid of increased viscosity to rise slightly in level, a conductor positioned vertically above the reservoir and having its lower end disposed below the liquid level thereof, a syphon tube extending from the upper end of the conductor to a point below the lower end thereof so as to form a syphon which draws liquid upwardly through the conductor, a tubular member communicating with the interior of the conductor and having means for indicating the vacuum exerted by a column of liquid between the member and the liquid level in the reservoir, means for introducing washed fluid into the tubular member so as to maintain the liquid level therein substantially constant, means for regulating the supply of said fluid, means for starting the syphon action, and means for returning the overflow liquid from the reservoir and the liquid from the syphon tube into the pipe under pressure.

7. A liquid density determining device including, a conductor having its lower end disposed within a body of liquid adapted to be maintained at a substantially constant level, the conductor forming a part of a syphon by means of which liquid is caused to flow through said conductor, means communicating with the interior of the conductor at a point above said liquid level, and means for indicating the vacuum exerted within the communicating means by the column of liquid between said latter means and the substantially constant liquid level.

8. A liquid density determining device as set forth in claim 7 including, means for introducing a fluid within the communicating means so as to maintain the liquid level in said means constant.

9. A liquid density determining device as set forth in claim 5 wherein the means for maintaining the level of the body of liquid substantially constant includes an overflow tube having a restricted cross-sectional area so as to permit liquid of increased viscosity to rise slightly in level and thereby compensate for the increased friction of the liquid in passing through the conductor.

ROSS BASSINGER.